United States Patent [19]

Kupcíkevicius et al.

[11] Patent Number: 4,466,464
[45] Date of Patent: Aug. 21, 1984

[54] OVERWRAPPED DISK PAIRS IN A PACKAGE ARTICLE FOR AUTOMATICALLY AND CONTINUOUSLY MAKING SAUSAGES WITH FLAT ENDS

[75] Inventors: Vytautas Kupcíkevicius; Vytas A. Raudys, both of Chicago, Ill.

[73] Assignee: Union Carbide Corporation, Danbury, Conn.

[21] Appl. No.: 430,897

[22] Filed: Sep. 30, 1982

[51] Int. Cl.³ ..................... A22C 11/02; F16C 11/00
[52] U.S. Cl. ................................. 138/118.1; 426/105; 428/36
[58] Field of Search ............... 138/118.1; 17/1, 41, 17/42, 49, 35; 426/105, 124, 129; 428/36

[56] References Cited

U.S. PATENT DOCUMENTS

| | | |
|---|---|---|
| Re. 30,265 | 5/1980 | Kupcikevicius et al. |
| Re. 30,390 | 9/1980 | Kupcikevicius et al. |
| 2,654,121 | 10/1953 | Nelson |
| 2,983,949 | 5/1961 | Matecki |
| 2,984,574 | 5/1961 | Matecki |
| 3,233,281 | 2/1966 | Swift |
| 3,777,331 | 12/1973 | Falborg |
| 3,808,638 | 5/1974 | Kupcikevicius et al. |
| 4,007,761 | 2/1977 | Beckman |
| 4,077,090 | 3/1978 | Frey et al. |
| 4,164,057 | 8/1979 | Frey et al. |

FOREIGN PATENT DOCUMENTS 50-45379  5/1975  Japan .

*Primary Examiner*—William R. Dixon, Jr.
*Attorney, Agent, or Firm*—Dale Lynn Carlson

[57] ABSTRACT

Package article useful in producing sausages having flat ends. The package article comprises a shirred casing having at least one unshirred portion and having disposed inside said unshirred portion at least two pairs of flattening annular disks with a central hole in each of said annular disks. The disk pairs are detachably-attached, at least one disk of each pair being fixedly-attached by flexible means to a disk of an adjoining pair. Additionally, the disks are overwrapped with a rigid or flexible material. Also disclosed is a method of making the package article comprising disposing inside an unshirred portion of a shirred casing stick at least two overwrapped annular disks.

20 Claims, 9 Drawing Figures

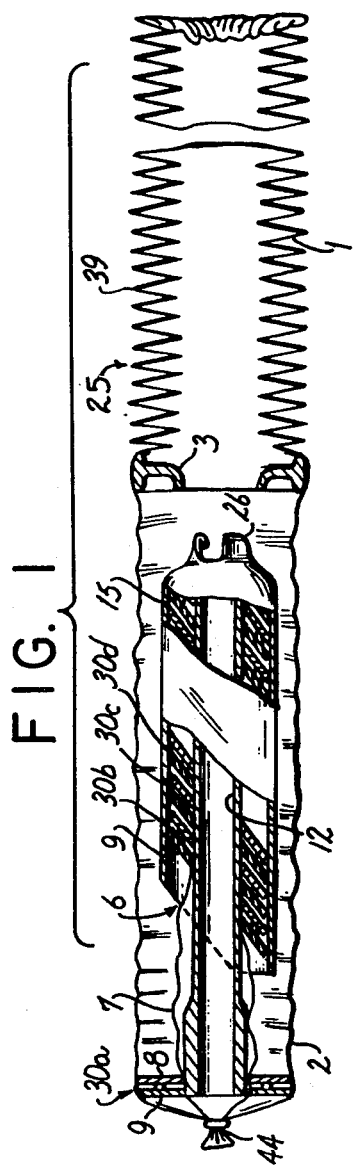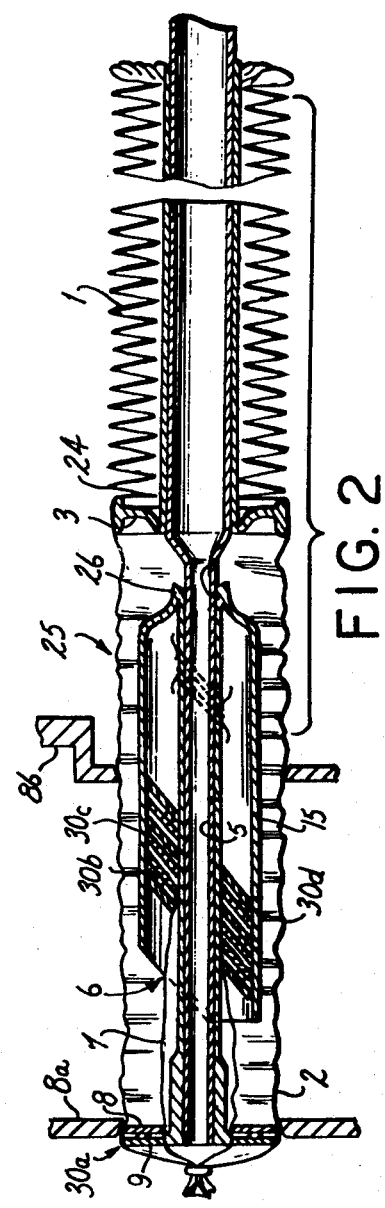

OVERWRAPPED DISK PAIRS IN A PACKAGE ARTICLE FOR AUTOMATICALLY AND CONTINUOUSLY MAKING SAUSAGES WITH FLAT ENDS

DESCRIPTION

RELATED APPLICATIONS

The following applications are related to, and were filed on the same date as, the instant application: U.S. application Ser. Nos. 430,230 to Kupcikevicius, et al; 430,442 to Kupcikevicius; 431,535 to Frey; 432,053 to Raudys; and 429,395 to Kupcikevicius. Also related is Ser. No. 448,349 to Raudys filed 12/9/82.

FIELD OF THE INVENTION

This invention relates generally to the production of large sausage products, and, more specifically, to a package article useful in continuously producing such products with flat ends.

BACKGROUND OF THE INVENTION

Large sausage casings are generally manufactured from materials such as regenerated cellulose, or regenerated cellulose having fibrous webs embedded therein, and are employed in the manufacture of large sausage products such as salami and bologna sausages, spiced meat loafs, cooked and smoked ham butts and the like. Such large sausage casings are produced in flat widths ranging in size from about 2 to 15 inches and range in length from about 14 to 72 inches and longer. The large sausage casings most commonly used for commercial production of large sausage products range in size from about 3 to 8 inches in flat width and from about 18 to 72 inches in length.

In recent years, systems for automatically stuffing meats and food emulsions into casings in a continuous fashion have become well-known in the art. Such systems are disclosed, for example, in U.S. Pat. No. Re. 30,390 and U.S. Pat. Nos. 4,077,090 and 4,164,057. Such systems commonly employ shirred tubular cellulosic food casings as disclosed, for example, in U.S. Pat. Nos. 2,983,949 and 2,984,574 to Matecki.

In the production of a large sausage product, a large sausage casing is first gathered over the end of a stuffing horn and then stuffed with a food emulsion. The thusly stuffed and encased food emulsion is subsequently cooked or cured according to conventional processes. Many of these large sausage products are thereafter sliced and packaged into units of predetermined weight and slice count for retail sale. The slicing devices employed in such packaging operations are pre-set to yield a specific weight-by-slice count for use in obtaining unit packages of equal weight. Since a large sausage casing stuffed with a food emulsion has two generally hemispherical or rounded ends, these rounded ends are generally not used in producing equal weight packages and are reworked (i.e., recycled in the production of a subsequent batch of food emulsion).

In order to minimize the rework resulting from these rounded ends, many prior attempts have been made to flatten them by utilizing a variety of methods and apparatus. While such attempts have attained some degree of success, none has proved to be entirely satisfactory. For example, U.S. Pat. No. 3,808,638 discloses a method for producing large sausage products having one pre-flattened end. Although this method reduces the sausage end rework by one-half, substantial rework is still present in the non-flattened end. As a further example, U.S. Pat. No. 3,777,331 discloses a method and apparatus for producing encased sausage with two flat ends whereby the end pieces are inserted in a non-fully automatic fashion. Such method and apparatus is limited to the use of continuous lengths of non-shirred casing, and does not lend itself to efficient commercial operation.

OBJECT OF THE INVENTION

It is an object of the present invention to provide a casing package article that is useful in continuously and automatically producing large sausage products with substantially flat ends from shirred casings, thereby improving slice yield and avoiding or minimizing the rework associated with the rounded ends of conventional sausages.

This and other objects of the invention will become apparent from a reading of the specification.

SUMMARY OF THE INVENTION

The present invention encompasses a package article comprising a shirred casing having at least one unshirred portion containing at least one pair of flattening annular disks, said pairs being detachably-attached, at least one disk of each pair being fixedly-attached by means of a flexible tubular membrane to a disk of an adjoining pair, said pairs of disks being overwrapped with a rigid or flexible material. Each of the annular disks must have an outer diameter less than the casing burst diameter for said casing. As used herein the term "casing burst diameter" denotes a diameter that is excessive to the extent that the casing integrity is lost and there is at least one break-point in the casing. The diameter of the central hole in each of said annular disks generally does not exceed 99 percent (preferably 90 percent, more preferably 50 percent) of the annular disk outer diameter.

In another aspect, the present invention relates to a method of making a package article for use in automatically and continuously stuffing food product employing at least one shirred casing stick which comprises:

(a) providing a shirred casing stick having an unshirred portion and a shirred portion, and (b) disposing inside said unshirred portion of said casing stick at least one pair of flattening annular disks, said pairs being detachably-attached, at least one disk of each pair being fixedly-attached by means of a flexible tubular membrane to a disk of an adjoining pair, said pairs of disks being overwrapped with a rigid or flexible material.

BRIEF DESCRIPTION OF THE DRAWINGS

FIG. 1 is a sectional view of a preferred package article of this invention.

FIG. 2 is a sectional view of a package article of the invention mounted on a stuffing apparatus with portions of said apparatus omitted which are not essential to an understanding of the invention.

DETAILED DESCRIPTION OF THE INVENTION

Figure 3:
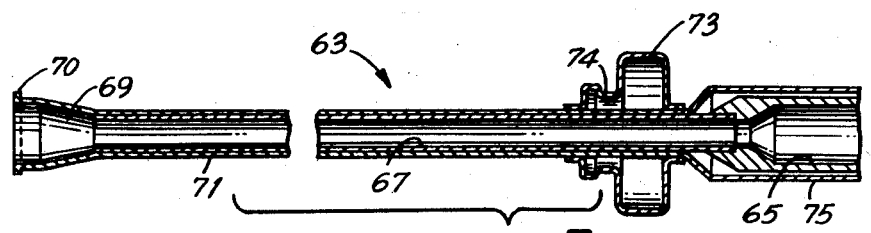
FIG. 3 is a partial profile view of a particularly preferred single-piece support tube configuration useful in the invention as mounted on a stuffing horn apparatus.

For a clearer understanding of the subject invention, reference is made to FIG. 1 wherein reference number 25 generally designates the prepackaged shirred tubular casing article of the invention. The prepackaged tubular casing article includes a shirred casing stick 1 having an unshirred portion 2. A sizing means in the form of a sizing disk 3 is implanted in the unshirred portion 2 of said shirred casing stick 1. Said sizing disk and its functions are described in U.S. Pat. Nos. 4,007,761, 4,077,090 and 4,164,057 and U.S. Pat. Nos. Re. 30,265 and Re. 30,390, all incorporated herein by reference. Also implanted within the unshirred portion 2 are at least two flattening annular disks, shown in FIG. 1 as disk pair 30a, which includes a trailing annular disk 8 and a leading annular disk 9. The terms "leading" and "trailing" as applied to the disk are defined hereinbelow. As used herein, the term "flattening annular disk" is used to designate any disk which has a central hole and which, when employed as an insert at either end of the stuffed sausage product, will at least partially (and preferably fully) flatten the end of such product, thereby producing a product generally having the shape of a right circular cylinder. A stuffed product having flat ends makes it possible to avoid or minimize rework resulting from the rounded ends associated with conventional sausages.

The flattening annular disks can have any of a wide variety of shapes and sizes including for example, round, elliptical, oval, and polygonal-with-rounded corners, provided that these disks generally conform in outer perimeter to the inner perimeter of the unshirred portion of the casing of the package article. In this regard, it is important that a tight seal exist between the inner casing perimeter and the outer annular disk perimeter so that a seal may be maintained during the stuffing operation and subsequent handling of the food product. When the annular disks are round in shape they preferably should have a central hole diameter not exceeding 90 percent of the annular disk outer diameter, although it is more preferable that the central hole diameter not exceed one-half the annular disk outer diameter. If the annular disks are not round, then the effective diameter of the central hole should preferably not exceed 90 (more preferably 50) percent of the effective annular disk outer diameter. When the central hole diameter of the annular disks approaches 99 percent of the annular disk outer diameter, the annular disks are properly envisioned as hoops. When using such hoops, they should be arranged in the form of the hereinafter-discussed extender modules. In the stuffed product, the hoops co-act with the flexible tubular membrane of the extender modules to prevent formation of hemispherical product ends and, instead, to provide substantially flat ends.

The central hole in the annular disks can also have a wide variety of sizes and shapes including, for example, round, elliptical, oval, and polygonal-with-rounded-corners. It is most preferable to have as small a central hole as possible in the annular disks since this will facilitate maximum flattening of the sausage end. Of course, the central hole in the annular disks cannot be smaller than the diameter of the stuffing horn or support tube upon which the annular disks are to be mounted, as further described hereinbelow.

It is preferred that the disks in themselves be supported in some fashion in order to insure their ordered integrity in a disk array 6 in the prepackaged, shirred tubular casing article 25, during shipping and handling, and before and during stuffing operations. Although wide variations in the support mechanism are envisioned, two preferred support mechanisms would include an overwrap 15 (either rigid or flexible) or a central support tube 12, or both. Typical overwrap for the annular disks would include flexible film such as polyvinylchloride film or polyethylene film. The central support tube 12, if used, would be one extending through at least a portion of the disk array 6. In a preferred embodiment, the support tube would be one that essentially fills the available cross sectional area provided by the central holes in the annular disks. The support tube, if used, preferably has a circular or elliptical cross section, more preferably an elliptical cross section. An elliptical central support tube is particularly preferred when using annular disks with a circular central hole since such a support tube configuration affords a maximum effective cross-section to the support tube for maximum food emulsion throughput while enabling the disks to be angularly disposed on the support tube as further described hereinbelow.

One or more of the above-described flattening annular disks can act as a sizing disk, performing a casing sizing function (i.e., circumferentially stretching the casing) as well as a flattening function. Generally speaking, at least some portion of the sizing function will be performed by one or more of the annular disks, either alone or co-acting with an optional sizing means, if used. Useful optional sizing means are described in U.S. Pat. Nos. 4,007,761; 4,077,090; and 4,164,057 and U.S. Pat. Nos. Re. 30,265 and 30,390 referenced above, all incorporated herein by reference.

In a preferred mode (subject of copending U.S. application Ser. No. 430,897), the flattening annular disks are detachably-attached in pairs, such as disk pairs 30a, b, c, etc. In turn, at least one disk of the pair is fixedly-attached by flexible means (preferably by means of a flexible tubular membrane) to a disk of an adjoining disk pair as more fully described hereinafter in conjuction with the drawings. Such a mode of attachment serves, among other things, as a vehicle to move the disks in pairs into position on the stuffing horn or stuffing horn extension and off the stuffing horn at appropriate times in the stuffing cycle.

Other vehicles for moving the disks are envisioned to fall within the full scope of the present invention, including flexible ribbons or cords connecting the disks, or "fingers" external to the unshirred portion of the casing to grab one or more disks and translate the disks parallel to said stuffing horn, or alternatively, translatable, retractable pins on the stuffing horn extension for moving the disks to the end of said extension. In a particularly advantageous aspect of the invention, it is preferred that the leading annular disk (i.e., the disk that is in place in the leading end of the sausage product) in each detachably-attached pair have a central hole having a diameter that is larger than the central hole diameter of the trailing annular disk in the pair. This difference in hole diameters between the leading and trailing disks can permit the trailing disk to be retained on the end of the stuffing horn or stuffing horn extension during stuffing operations while the leading disk passes over such end. Of course, if desired the disk can have central holes that are of comparable annular diameters. In an alternate embodiment, one disk in the array, namely the very first disk, can be a solid disk with no central hole.

Detachable-attachment of the leading and trailing disks of each disk pair 30a, b, c, etc. can be effected by any suitable means such as, for example, metal or plastic tabs located around the inner or outer perimeter of one disk which co-act with a mating surface on an adjoining disk to form a disk pair. A preferred mode of detachable-attachment involves the use of metal tabs located around the outer perimeter of one annular flattening disk of the pair which interlocks with the other of the pair as hereinafter more fully described in connection with the drawings.

Fixed-attachment of the flexible tubular membrane 7 between the annular disks of one pair and the annular disk of an adjacent pair is preferably effected in proximity to the inner perimeter of such annular disk by any suitable means, such as by employing a food-acceptable metal-to-plastic adhesive or by crimping the inner perimeter of the disk around the flexible tubular membrane. If the crimping method is used, care must be taken to avoid tearing the membrane during the crimping process. In this regard, it has been found advantageous to employ a plastic, e.g. polyethylene string inside the crimp itself to act as a cushion during the crimping process, thereby minimizing the possibility of tearing the flexible tubular membrane, as disclosed in copending application U.S. Ser. No. 430,220, incorporated herein by reference.

The flexible tubular membrane 7 as may be useful for fixed-attachment purposes is preferably a membrane constructed of a plastic film such as, for example, polyethylene film, polyvinyl chloride film or ethylene vinylacetate film. Polyethylene film is preferred. In use this flexible tubular membrane will permit the disk pairs 30b, c, d, etc. to collapse one against the other to form the relatively compact, ordered disk array 6 of disk pairs 30b, c, d, etc. It is preferred that the flexible tubular membrane occupy a minimum of space when fully collapsed in order to minimize the length of this array 6 of disk pairs.

It has been stated above that the number of trailing and leading flattening annular disks in the package article be at least two. It is preferred that the number of disks be sufficient to provide sausages of a length required in any given commercial situation, taking into account the length of casing available on the shirred stick in the package article and the length of the encased stuffed product required for a particular commercial operation. The required number of disks will be readily apparent to one of ordinary skill in the art, although it is preferred that the number of disks be at least ten. In this regard, either the length of casing in the shirred stick can be varied based on a fixed number of disks or the number of disks can be varied based on a fixed shirred stick length. Typically, a casing having a stuffed diameter of about 4.5 inches and an unshirred casing length of 200 feet might employ 50 of the disk pairs 30a, b, c, etc.

The flattening annular disks useful in the present invention can be made of a wide variety of materials provided that the surface of the material chosen, or coating on the surface of the material, meet the required government specifications for use with food products. Useful materials would include metals such as aluminum and steel, and plastics such as styrene and polypropylene. It is preferred that the disks each be of sufficient strength to resist deformation in the stuffed product. The preferred disks of the present invention are those constructed from 75 lb. tin-plated steel having a thickness of about 0.007 inch and having stiffening annular ribs, such as those often found in can lids, for added support. The tin-plated steel may be appropriately coated with a chromate conversion coating or other coating meeting the required government specifications for use with food products.

As shown in FIG. 1, an unshirred portion of casing length 2 passes over the first disk pair 30a and the disk array 6. The fore end of casing length 2 is closed, together with a portion of the flexible tubular membrane 7 attached to leading annular disk 9 of said first disk pair 30a, with a clip 44. The trailing annular disk 8 of said first disk pair 30a is detachably-attached to said leading annular disk 9 and fixedly-attached by means of a second piece of flexible tubular membrane 7 to the leading annular disk 9 of the next disk pair 30b.

In use, the flexible tubular membrane 7 serves as the link between the disk pairs of the disk array 6 and preferably serves as a vehicle to move the disk pairs from an inclined position in the disk array 6 to an upright position as shown for disk pair 30a.

The disk array 6 is preferably disposed in a fashion such that the disks therein are stacked at an acute angle to the longitudinal axis of the casing length 2 in order to allow free movement of the unshirred portion of the casing over the array during the stuffing operation.

Also shown in FIG. 1 is an overwrap 39 which, as set forth hereinabove, is utilized to cover the shirred casing length portion 1 of the package article 25 as well as the rest of the article. Said overwrap provides a protective covering for, and a degree of structural integrity to, the whole of the subject package article, and also provides a degree of moisture retention for the casing. The overwrap 39 is disposed in a manner to provide free access to the internal bore of the shirred casing stick 1 of the subject package article.

Although the overwrap is preferably a plastic film with elastic properties, other types of overwrap material could be utilized such as shrink or non-shrink plastic film, cellophane, paper, elastic netting and the like. A preferred overwrap is an elastic stretch film comprising polyvinyl chloride, but a shrink fitted overwrap comprising polyethylene film is also suitably employed. A second preferred overwrap is a closed flexible bag of polyethylene.

In use, the subject article of the invention, provided as a package article unit to the customer, is loaded on a stuffing apparatus. FIG. 2 shows one embodiment of the package article 25 in place in such a stuffing horn 5 of a stuffing apparatus. The shirred casing stick 1 of the subject invention is placed on the movable support sleeve 24 of said stuffing apparatus, and the sizing disk 3 is attached to the support sleeve by means of the frangible "fingers" of said sizing disk.

To attach the annular disk array 6 of the package article 25 to the stuffing horn 5, FIG. 1 and 2 show that the support tube 12, on which the array is mounted, includes a quick-connection attachment means 26 which attaches to a corresponding connector on the stuffing horn of said stuffing apparatus. One of the functions served by said support tube 12 is to maintain the ordered integrity of the annular disks in the package article.

In a preferred aspect, axially aligned with the support tube, are seal means 8a and positioning means 8b of said stuffing apparatus. The seal means is preferably a split seal ring that, in use, provides a tight seal between an unshirred portion of casing length 2 and trailing annular disk 8 of first disk pair 30a during the first stuffing cycle and between subsequent casing lengths and trailing disks for subsequent stuffing cycles. The positioning means preferably consists of a crescent-shaped ring adapted for fore-and-aft motion over disk array 6, and further adapted to move pairs of disks out of the array and into the stuffing position occupied by first disk pair 30a. The seal means and the positioning means are more clearly discussed in copending application U.S. Ser. No. 430,230, filed simultaneously with the instant application and assigned to the same assignee as this application.

The stuffing apparatus which can be employed in conjunction with the package article of the present invention is suitably a modified version of that set forth in U.S. Pat. No. Re. 30,390, incorporated herein by reference. In one embodiment for using the casing of the present invention, the support sleeve as disclosed in that reissue patent is fixed in place on the stuffing horn and does not move during the stuffing operation. In turn, the sizing disk of that reissue patent is rendered not movable on the stuffing horn. The sizing disk of the reissue patent can be made small enough to provide a degree of stretch-sizing, when used in conjunction with the slideable snubbing means of the reissue patent (modified to make it slideable) while permitting casing slacking when required during the casing closing cycle. A preferred apparatus is described in detail in copending U.S. application Ser. No. 430,230 also incorporated herein by reference. Of course, the package article of the present invention is envisioned to work with a wide variety of other apparatus that may be devised by those working in the field.

Briefly, the system disclosed in our U.S. application Ser. No. 430,230 involves an apparatus for automatically and continuously producing an encased food product having a uniform diameter and substantially flat ends comprising in combination, a frame, a stuffing horn assembly, including a support tube having an inlet end and a discharge end for conveying food product from a supply source, said support tube having a first portion adapted to carry a shirred tubular casing article, and said support tube having a tube portion adapted to hold an unshirred portion of said shirred tubular casing article including a plurality of axially disposed flattening annular disks inside said unshirred portion of casing, said tube portion extending through the central holes of said annular disks, means for advancing selected ones of said flattening annular disks to said discharge end and thereafter introducing a food product to be stuffed between said flattening annular disks, and control means operatively associated with said stuffing horn assembly to selectively control a cycle of successive stuffing and casing closing operations including moving said disks off of said stuffing horn extension after the introduction of a food product therebetween, thereby producing an encased product having predetermined length and diameter with substantially flat ends, said flat ends being due to one of said annular disks being located proximate to and inside each end of said encased product.

In another aspect our U.S. application Ser. No. 430,230 involves a method for automatically and continuously producing encased food product having a uniform diameter and substantially flat ends which comprises:

(a) mounting a shirred tubular casing article, including a plurality of flattening annular disks disposed inside a closed-end unshirred portion of said shirred tubular casing, onto a stuffing horn of a food stuffing apparatus;

(b) positioning a first flattening disk and an annular second disk of said plurality proximate to the closed end of said casing and the discharge end of said stuffing horn such that the flattening portions of said first and second disks are essentially perpendicular to the axis of said stuffing horn;

(c) discharging a pressurized food product from the discharge end of said stuffing horn between said first and second disks in an amount sufficient to form an encased food length between said first and second disks;

(d) gathering an unshirred portion of said casing at a point after the trailing end of the encased food length and closing the casing at said point to provide a fully closed encased food product having substantially flat ends;

(e) positioning a succeeding pair of annular flattening disks proximate to the discharge end of said stuffing horn such that the flattening portion of each disk of said succeeding pair of disks is essentially perpendicular to the axis of said stuffing horn; and, closing the succeeding casing length; and, severing the fully closed encased food product; and, (f) repeating steps (c) through (e) using said third and fourth disks instead of said first and second disks to form another encased food length.

The package article of the present invention is suitable for use with the so-called cored high density (CHD) system as set forth in co-pending U.S. application Ser. No. 261,304, incorporated herein by reference. The CHD system involves flexible tubular cellulosic food casing shirred and compressed onto a rigid hollow tubular core to a high compaction condition to produce a casing stick with enhanced stuffing length capacity, structural stability and strength, and larger stuffing horn adaptability. In a preferred aspect, the sizing means employed in the present invention is molded to the tubular core of the CHD casing article. The tubular core of the CHD casing article can act as part of the stuffing horn itself or as a tension sleeve fitting over a stuffing horn, such as the tension sleeve disclosed in U.S. Pat. No. 4,007,761. If the tubular core is used as the stuffing horn it may require support at the stuffing end in order to insure stability and prevent flopping or axial misalignment.

Figure 4:
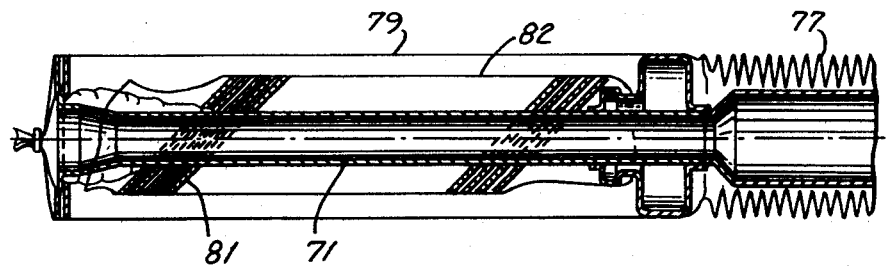
FIG. 4 is a partial sectional view of a package article incorporating the single-piece support tube configuration of FIG. 3 showing shirred casing.

An alternate and preferred embodiment of the present invention is shown in FIG. 3 wherein a single-piece support tube 63 is shown fit over a stuffing horn assembly including a stuffing horn 65 and stuffing horn extension 67. The single-piece support tube 63 comprises a conical nose piece 69 having a flexible end lip 70, an elliptical support sleeve 71 for carrying an array of the disk pairs, a sizing means 73, and a disk array overwrap tie-down slot 74 all fit together with a CHD tubular core 75 to provide strength and coherency advantages that are associated with single piece construction. Fig. 4 shows a package article utilizing the above-discussed single-piece support tube on which is mounted a shirred casing stick 77 and an unshirred casing length 79. Disposed within the unshirred casing length is a disk pair array 81 and an array overwrap 82, all mounted thereon.

Figure 5:
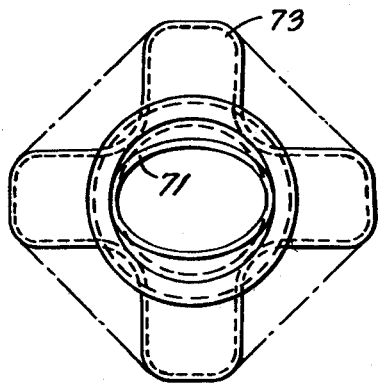
FIG. 5 is a vertical cross-sectional view of a preferred clover-leaf design sizing means useful in the package article of the invention.

The disk array 81 is preferably canted for use during stuffing as shown in FIG. 4. Since the casing to be stuffed can have an inner diameter approaching the outer diameter of the disk array 81, the canting will allow the casing to be drawn over the disk array and its overwrap 82 during the stuffing operation with minimal drag. This allows the support tube 71 and the stuffing horn extension to be generally elliptical in vertical cross-section (see FIG. 5) because the projection of the round, but canted, central holes of the disk array 81 onto a plane normal to the axis of the stuffing horn will be an ellipse. This elliptical shape for the stuffing horn affords maximum emulsion throughput during stuffing. A preferred shape of sizing means 73 is a clover leaf design as shown in FIG. 5. A detailed description of this type of sizing means is given in co-pending application U.S. Ser. No. 430,582. In brief, this type of sizing means cooperates with means external to the casing to stretch-size the casing into the recesses and over the lands of the clover leaf to provide the desired effective diameter.

Figure 6:
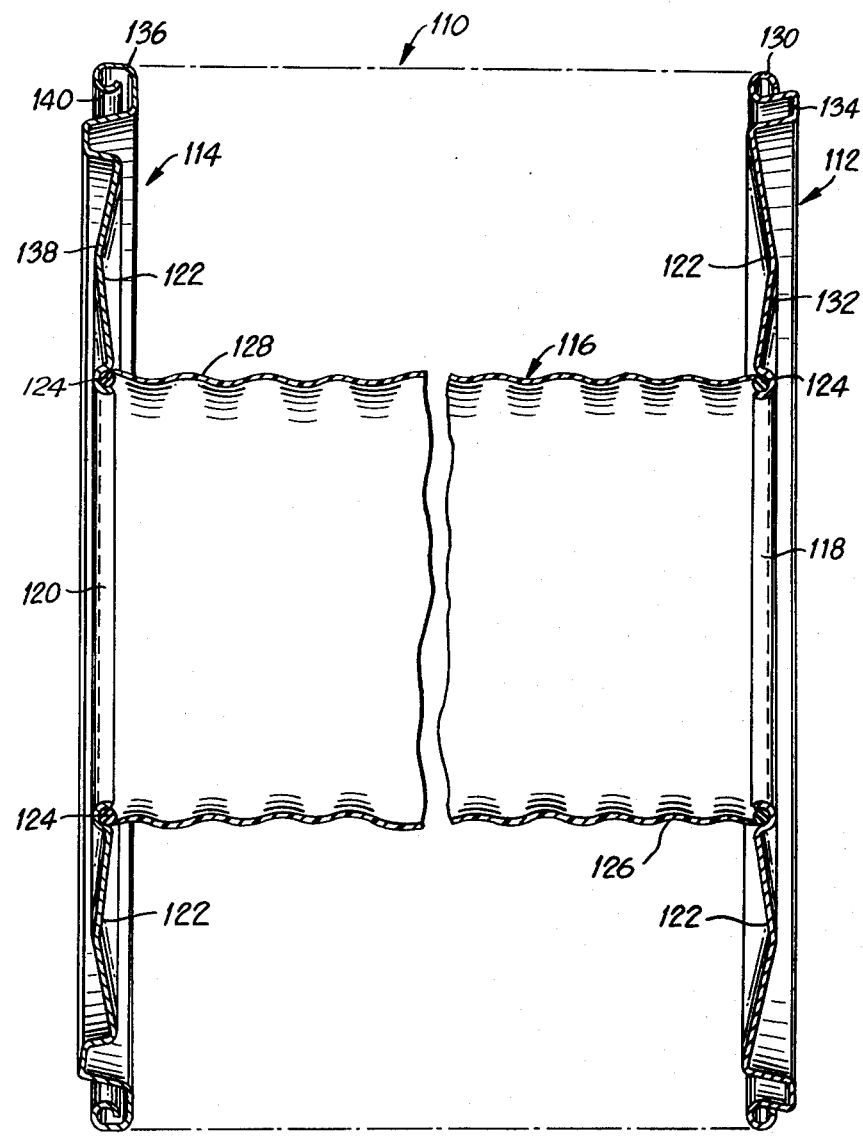
FIG. 6 is a sectional view of a preferred arrangement for the annular disks useful in the invention whereby two disks are fixedly-attached by means of a flexible tubular membrane.

FIG. 6 shows two annular disks useful in the present invention, fixedly-attached as generally indicated at 110 (hereinafter called an "extender module"), which can be adapted for use in the automatic production of large sausage products having flat ends. The extender module 110 includes a leading disk 112 and a trailing disk 114 connected by a flexible tubular membrane 116.

The terms "leading" and "trailing" as applied to the disks, denotes whether the particular disk forms the leading end, or the trailing end respectively, of a stuffed product. Thus, with reference to the extender module 110 as shown in FIG. 6, trailing disk 114 will go to form a flat trailing end of a first stuffed product during the stuffing operation while leading disk 112 will go to form a flat leading end of the next stuffed product.

Each disk 112, 114 as shown in FIG. 6, is generally the shape of a substantially flat, annular disk. Preferably, the central opening 118 in leading disk 112 is larger in diameter than the central opening 120 in trailing disk 114 for purposes set out herein below.

Also, it is preferred that each opening 118, 120 be as small as possible as this will facilitate maximum flattening of the ends of the stuffed product. Since in a preferred embodiment, both disks will be located on a stuffing horn assembly, the size of the openings 118, 120 should be sufficient to allow passage of the stuffing horn.

Each disk 112, 114 is slightly dished about its opening as shown at 122. In part, this strengthens each disk and helps to prevent deformation in use. The portion of each disk about openings 118, 120 is also bent inward and formed about a core 124 of polyethylene or other suitable, relatively resilient material. Captured between each core and the material of the disk as formed about these cores, are the respective ends 126, 128 of the tubular membrane 116. In this fashion the tubular membrane defines a tubular passage having one end 126 defined by opening 118 in the leading disk 112 and its second end defined by opening 120 in the trailing disk 114.

Leading disk 112 has a bead or rim 130 formed about the outer periphery to add strength and rigidity to the disk. Since, in use, disk 112 will be disposed within a stuffed casing, the bead also will help to prevent the disk from damaging the casing during the stuffing process as the casing is stretched over the bead to effect a seal between the inner perimeter of the casing and the outer perimeter of the leading disk 112.

Formed on the rear, or outwardly facing surface 132 of leading disk 112 is an annular shoulder 134. This shoulder is disposed about the leading disk adjacent its outer periphery for purposes set out herein below.

As shown in FIG. 6, the trailing disk 114 has its outer periphery formed with a flange 136 that is bent or rounded over the front or leading face 138 of the disk. This configuration provides the rim of the trailing disk 114 with a rounded surface so that in use, a casing can be stretched over the trailing disk to effect a seal similar to the seal between the casing and the leading disk. This configuration also provides an annular lip 140 which extends about the periphery of the trailing disk. This lip is not continuous but has pieces removed so as to form plurality of tabs 140, spaced about the periphery of the trailing disk.

Tabs 140 on the trailing disk 114 and the shoulder 134 on the leading disk 112 are coincident, and the respective sizes of shoulder 134 and tabs 140 are such that the shoulder can snap fit under the tabs. With this arrangement, a leading disk 112 of one extender module can be detachably connected on the trailing disk 114 of a second extender module simply by aligning the respective leading and trailing disks and then snapping shoulder 134 beneath tabs 140 as shown in FIG. 7.

Figure 7:
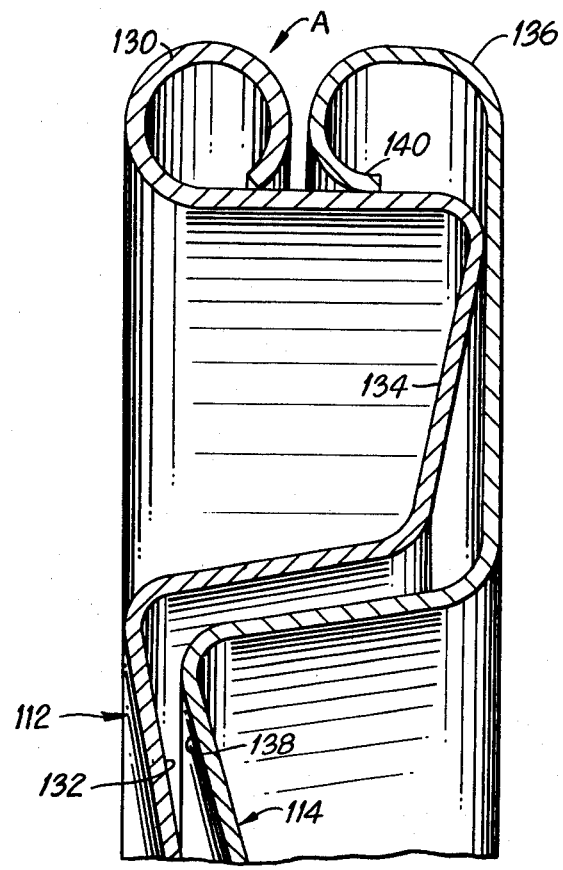
FIG. 7 is a cut-away view of a disk pair showing a preferred means of detachable-attachment for the disk pair.

For purposes of describing the present invention, a leading and a trailing disk which are detachably connected together as shown in FIG. 7 will be referred to as a disk pair and will be identified by letters A, B, C, etc. Thus, FIG. 7 shows a disk pair A formed by detachably connecting a leading disk 112 of one extender module 110 (FIG. 6), to the trailing disk 114 of another identical extender module. In this fashion, any number of extender modules 110 can be detachably connected to form an ordered array of disk pairs A, B, C, etc., each disk pair being connected to the following disk pair by flexible tubular membrane 116. Such an arrangement is shown in FIG. 8.

Figure 8:
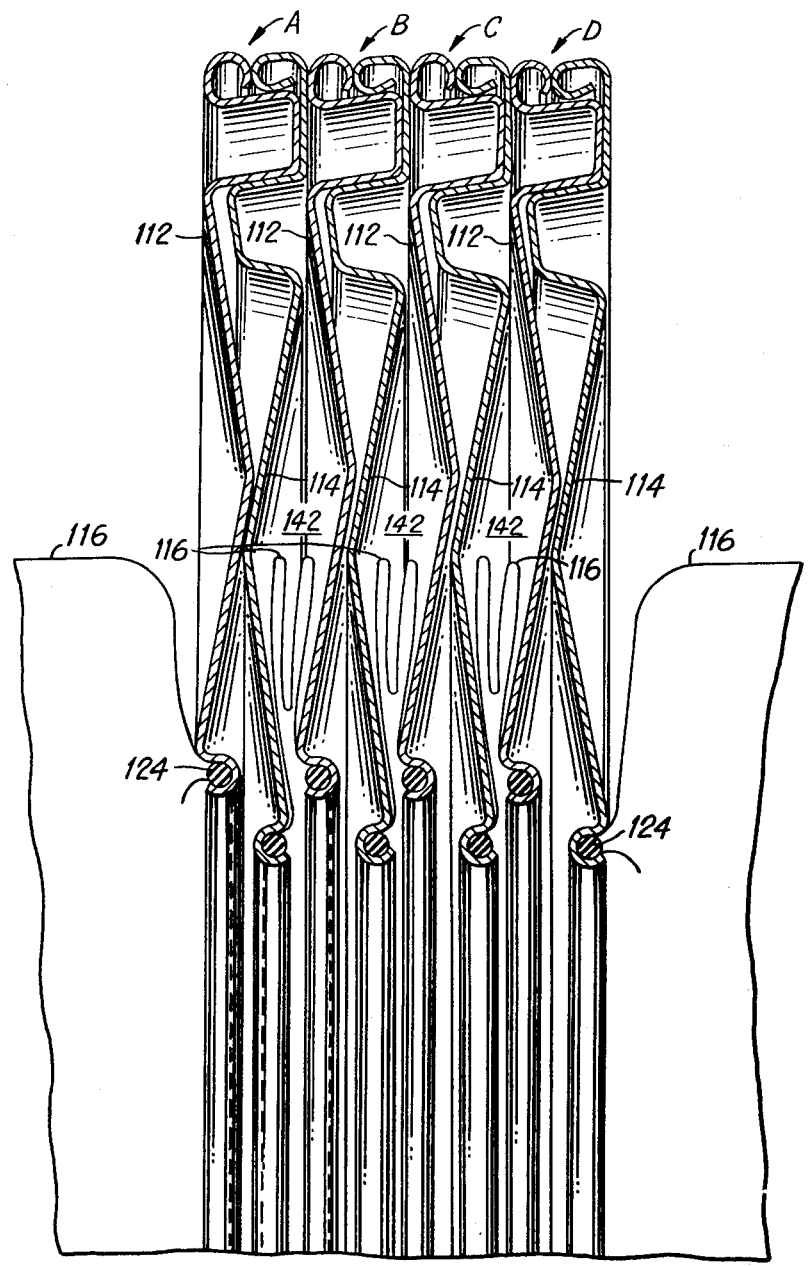
FIG. 8 is a sectional view of an array of disk pairs.

FIG. 8 shows four disk pairs A, B, C and D connected one to another by tubular membranes 116. It should be understood that four disk pairs are shown for purposes of illustration only and that any number of extender modules 110 can be connected as may be needed. Moreover, since tubular membrane 116 is flexible, the disk pairs A, B, C and D can be collapsed axially one against the other to form a relatively compact, ordered array of disk pairs. When the disk pairs are collapsed together, the dished configuration of each leading and trailing disks 112, 114 respectively, as described herein above, provides a space 142 to accommodate the tubular membrane 116 which folds into this space.

Figure 9:
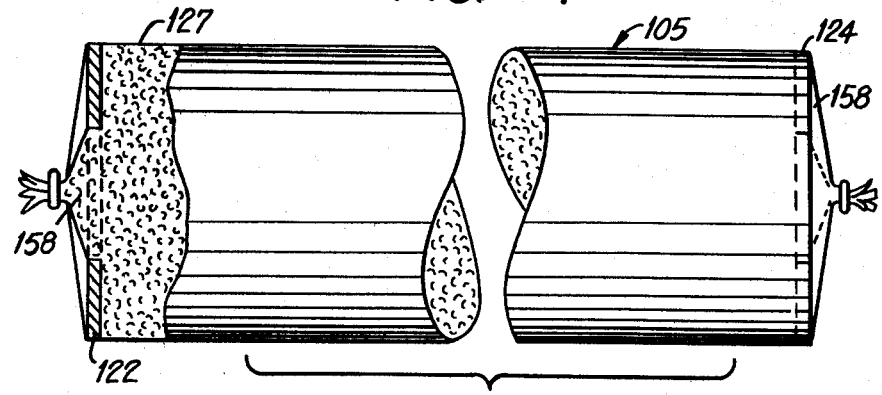
FIG. 9 is a view of a sausage product produced using the package article of the invention.

FIG. 9 shows a sausage 105 produced using the package article of the present invention. The sausage 105 is encased by casing 127 and is shown with substantially flat ends produced by flattening annular disks 122, 124. The emulsion contained in pockets 158 must be reworked. It should be noted, however, that the rework contained in the pockets is substantially minimal as compared to that found in the rounded ends of the prior art sausages, as discussed in the following example.

The following example is intended to illustrate, but in no way limit, the present invention.

EXAMPLE

In order to show the improvement associated with the article of the present invention a conventional stuffing apparatus of the type shown in U.S. Pat. No. Re. 30,390 and sold by Union Carbide Corporation as a Model 400 F SHIRMATIC stuffing apparatus, was modified as described in concurrently filed U.S. application Ser. No. 430,230 directed to a method and apparatus that employs the article of the present invention, incorporated herein by reference. An extender package article as shown in FIG. 1 was mounted to the modified apparatus and the modified apparatus operated continuously and automatically to produce stuffed products having substantially flat ends.

As a control, a similar but unmodified apparatus, as disclosed in U.S. Pat. No. Re. 30,390 was operated in a conventional manner to produce stuffed products having conventional rounded ends. The control stuffed products were made using a SHIRMATIC shirred casing article as disclosed in U.S. Pat. No. 4,007,761, incorporated herein by reference.

Both runs utilized a SHIRMATIC clear, size 7½K casing and each apparatus was adjusted to stuff the casings to the manufacturer's recommended "green" (i.e. unprocessed) diameter of about 4.62 inches. Also, a similar meat bologna emulsion was utilized for each run.

Fourteen stuffed products were then made using the modified apparatus and thirteen using the conventional apparatus. Measurements taken about the midpoint of each product were uniform and midpoint diameters for each product averaged 4.63 inches.

After stuffing, all products underwent similar processing in a smoke chamber and were stored at 30° F. for 24 hours to produce the finished products for slicing.

Each product was sliced using a deli-type sausage slicing machine set to produce a slice 0.17 inches thick. Both the leading and trailing end of each product was sliced until the mean slice diameter approached 4.44 inches for the leading end and 4.52 inches for the trailing end.

An average of 13 slices were cut from each end of the conventional products before approaching the finished mean diameters as set out above. In comparison, only an average of 1.5 slices were taken from each end of the flat ended products made using the flattening disks and modified stuffing apparatus as described herein.

The weight of the individual slices and the combined total weight for slices from both ends of each product were recorded. This data indicated that the average amount of rework for each product having the conventional rounded ends totaled 833 grams. In contrast, the weight of the rework from the flat ended stuffed products averaged only 102 grams. The rework from the flat-ended product was only 12.2% of the rework from the conventional round-ended product.

To confirm the overall uniformity of the finished product diameter of the flat ended stuffed products, an additional six slices were taken from the end of each product. The mean diameter and weight of each of these additional slices were uniform and within acceptable limits for commercial packaging in weight-by-slice count packages.

The eight-fold decrease in rework and the slice count increase from each product as demonstrated by this test, established that the method and apparatus of the present invention are suitable for use in the continuous and automatic production of stuffed products having flat ends.

We claim:

1. A package article comprising a shirred casing having at least one unshirred portion containing at least two pairs of flattening annular disks, there being a central hole in each of said annular disks, said pairs being detachably-attached, at least one disk of each pair being fixedly-attached by flexible means to a disk of an adjoining pair, said pairs of disks being overwrapped with a rigid or flexible material.

2. The package article of claim 1 wherein said annular disks have a central support tube extending through the central holes of at least a portion of said annular disks.

3. The package article of claim 2 wherein said support tube has a cross section that essentially fills the available cross sectional area provided by said central holes.

4. The package article of claim 2 wherein said support tube has a circular or elliptical cross section.

5. The package article of claim 1 wherein said annular disks each have an identical shape selected from the group consisting of round, oval, elliptical and polygonal-with-rounded-corners.

6. The package article of claim 1 wherein the central hole in each annular disk has a shape that is selected from the group consisting of round, oval, elliptical and polygonal-with-rounded-corners.

7. The package article of claim 1 wherein the diameter of the central hole in each of said annular disks does not exceed 50 percent of the annular disk outer diameter.

8. The package article of claim 1 which additionally contains a sizing means.

9. The article of claim 8 wherein said sizing means is a sizing disk.

10. A package article comprising a shirred tubular casing having at least one unshirred portion and having disposed inside said unshirred portion at least ten flattening annular disks, there being a central hole in each of said annular disks, which are detachably-attached in pairs, at least one disk of the pair being fixedly-attached by means of a flexible tubular membrane to a disk of an adjoining pair, said tubular membrane being a plastic film, each of said disks having a central hole diameter that does not exceed 50 percent of the annular disk outer diameter, the leading disk of the pair having a central hole with a diameter larger than the central hole diameter of the trailing annular disk of the pair, a central support tube of circular or elliptical cross section extending through the central holes of said disks, said annular disks being canted relative to the longitudinal axis of the shirred casing, said pairs of disks being overwrapped with a rigid or flexible material, said unshirred portion of casing and a portion of said tubular membrane being pre-clipped at one end, said package article being overwrapped with a polyvinylchloride elastic film or a polyethylene shrink fitted overwrap, said package article additionally containing a sizing means in the unshirred portion of the casing.

11. A method of making a package article for use in automatically and continuously stuffing food product employing at least one shirred casing stick which comprises:
   (a) providing a shirred casing stick having an unshirred portion and a shirred portion, and
   (b) disposing inside said unshirred portion of said casing stick at least two pairs of flattening annular disks, there being a central hole in each of said annular disks, said pairs being detachably-attached, at least one disk of each pair being fixedly-attached by means of a flexible tubular membrane to a disk of an adjoining pair, said pairs of disks being overwrapped with a rigid or flexible material.

12. The method of claim 11 wherein said package article is made in situ at a use site and assembled on a stuffing horn or central support tube.

13. The method of claim 11 including the step of inserting a sizing means into said unshirred portion intermediate said shirred casing portion and said flattening annular disks.

14. The package article produced by the method of any of claims 11 through 13.

15. The package article of claim 1 wherein said flexible means is a flexible tubular membrane of plastic film.

16. A package article comprising a shirred casing and a plurality of flattening annular disks, there being a central hole in each of said annular disks, said annular disks being detachably-attached in pairs, at least one disk of the pair being fixedly-attached by flexible means to a disk of an adjoining pair, said casing and said annular disks both being axially mounted on a tube, said pairs of disks being overwrapped with a rigid or flexible material.

17. A package article comprising a shirred casing having at least one unshirred portion and having disposed inside said unshirred portion two annular disks, there being a central hole in each of said annular disks, said annular disks being detachably-attached in a pair, said pair of disks being overwrapped with a rigid or flexible material.

18. The package article of claim 1 wherein each of said pairs of disks has a leading disk having a central hole with a diameter larger than the central hole diameter of the trailing disk of the pair.

19. The package article of claim 1 wherein said annular disks are canted relative to the longitudinal axis of the shirred casing.

20. The package article of claim 15 wherein a second disk of the pair is fixedly-attached to said unshirred portion of casing by a portion of tubular membrane which is confined together with the end of the unshirred casing portion by a casing closure means.

* * * * *